(12) United States Patent
Imura (10) Patent No.: US 8,164,311 B2
(45) Date of Patent: Apr. 24, 2012

(54) CONTROL DEVICE FOR ELECTRIC ROTATING MACHINE

(75) Inventor: Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 272 days.

(21) Appl. No.: 12/725,702

(22) Filed: Mar. 17, 2010

(65) Prior Publication Data

US 2010/0262307 A1 Oct. 14, 2010

(30) Foreign Application Priority Data

Apr. 10, 2009 (JP) ................... 2009-096443

(51) Int. Cl.
*H02P 11/00* (2006.01)
*H02P 9/00* (2006.01)
*H02H 7/06* (2006.01)
*H02P 6/12* (2006.01)
*H04N 7/12* (2006.01)
*G06F 1/00* (2006.01)

(52) U.S. Cl. ........... 322/37; 318/400.15; 375/240.12; 713/322

(58) Field of Classification Search ............... 322/37; 318/400.15; 375/240.12; 713/322
See application file for complete search history.

(56) References Cited

U.S. PATENT DOCUMENTS

| 5,650,713 | A | * | 7/1997 | Takeuchi et al. | 322/16 |
| 5,790,396 | A | * | 8/1998 | Miyazaki et al. | 363/96 |
| 6,121,736 | A | * | 9/2000 | Narazaki et al. | 318/400.35 |
| 6,278,194 | B1 | * | 8/2001 | Nakagawa et al. | 290/31 |
| 6,683,435 | B1 | * | 1/2004 | Liang et al. | 318/727 |
| 6,690,593 | B2 | * | 2/2004 | Kimura et al. | 363/98 |
| 6,771,040 | B2 | * | 8/2004 | Kusumoto et al. | 318/801 |
| 6,928,566 | B2 | * | 8/2005 | Nunomura | 713/322 |
| 7,068,526 | B2 | * | 6/2006 | Yamanaka et al. | 363/98 |
| 7,106,013 | B2 | * | 9/2006 | Narumi et al. | 318/400.25 |
| 7,256,561 | B2 | | 8/2007 | Geyer et al. | 318/400.15 |
| 7,285,930 | B2 | * | 10/2007 | Weinmann et al. | 318/400.31 |
| 7,400,104 | B2 | * | 7/2008 | Sato | 318/376 |
| 7,592,761 | B2 | * | 9/2009 | MacKay | 318/254.1 |
| 7,692,395 | B2 | * | 4/2010 | Brown | 318/400.13 |
| 7,723,945 | B2 | * | 5/2010 | Okamura | 318/805 |
| 7,940,020 | B2 | * | 5/2011 | Brown | 318/400.13 |
| 8,106,622 | B2 | * | 1/2012 | Aoki et al. | 318/812 |
| 8,111,027 | B2 | * | 2/2012 | Nakayama | 318/400.15 |
| 2002/0095610 | A1 | * | 7/2002 | Nunomura | 713/322 |

(Continued)

FOREIGN PATENT DOCUMENTS

JP 2006-174697 6/2006

(Continued)

*Primary Examiner* — Pedro J Cuevas
(74) *Attorney, Agent, or Firm* — Nixon & Vanderhye PC (57) ABSTRACT

A control device has a unit for selecting each of states of an inverter applying a voltage to a generator, a unit for predicting a first current of the generator, flowing at a second time elapsed by one control period from a first time, from a detected current and the state of the inverter at the first time, a unit for predicting a second current of the generator at a third time elapsed by one control period from the second time while using the first current as an initial value of the second current, from information indicating one selected state set at the second time, for each selected state, a unit for determining one state corresponding to the second current nearest to instruction, and a unit for setting the inverter in the determined state at the second time to control current of the generator.

5 Claims, 7 Drawing Sheets

U.S. PATENT DOCUMENTS

| | | | |
|---|---|---|---|
| 2009/0096395 A1* | 4/2009 | Nakayama | 318/400.15 |
| 2010/0118943 A1* | 5/2010 | Shiodera et al. | 375/240.12 |
| 2010/0246673 A1* | 9/2010 | Tanaka et al. | 375/240.12 |
| 2010/0259204 A1* | 10/2010 | Imura | 318/400.02 |
| 2011/0006711 A1* | 1/2011 | Imura et al. | 318/400.07 |
| 2011/0050137 A1* | 3/2011 | Imura et al. | 318/400.15 |
| 2011/0193505 A1* | 8/2011 | Matsuki et al. | 318/400.02 |

FOREIGN PATENT DOCUMENTS

JP  2008-228419  9/2008

* cited by examiner

| VOLTAGE VECTORS | SWITCHING ELEMENTS SET AT ON STATE | | |
|---|---|---|---|
| | U-PHASE | V-PHASE | W-PHASE |
| V0 | ESun | ESvn | ESwn |
| V1 | ESup | ESvn | ESwn |
| V2 | ESup | ESvp | ESwn |
| V3 | ESun | ESvp | ESwn |
| V4 | ESun | ESvp | ESwp |
| V5 | ESun | ESvn | ESwp |
| V6 | ESup | ESvn | ESwp |
| V7 | ESup | ESvp | ESwp |

CONTROL DEVICE FOR ELECTRIC ROTATING MACHINE

CROSS-REFERENCE TO RELATED APPLICATION

This application is based upon and claims the benefit of priority of the prior Japanese Patent Application 2009-96443 filed on Apr. 10, 2009, so that the contents of which are incorporated herein by reference.

BACKGROUND OF THE INVENTION

1. Field of the Invention

The present invention relates to a control device which controls a controlled variable of a multiphase electric rotating machine by controlling a power inverting circuit having a plurality of switching elements such that each switching element electrically connects or disconnects one of a plurality of voltage applying portions, applying different voltages, to or from one of terminals of the machine.

2. Description of Related Art

A control device for a three-phase motor has been used. For example, this device performs a pulse width modulation (PWM) control, based on triangular wave comparison, for the motor to control three phase currents, actually flowing through respective phase windings of the motor, to an instructed value under the feed-back control. In this PWM control, an instructed value of phase voltages to be applied from an inverter to the respective phase windings of the motor is calculated, and switching elements of the inverter are operated based on the difference between the level of a carrier signal shaped in a triangular wave and the instructed value.

However, when this PWM control is performed in an excessive modulation region in which the instructed voltage value is higher than an input voltage of the inverter, levels of higher harmonic waves contained in the output voltage of the inverter increase. In this case, the higher harmonic waves undesirably influence the response characteristics of the current flowing through the phase windings of the three-phase motor. This problem is arisen because it is assumed in the design of a current control system that the output voltage of the inverter can be always set at the instructed value.

To avoid this problem, Published Japanese Patent First Publication No. 2008-228419 proposes a model prediction control performed in a control device. In this control, a plurality of operating states of an inverter applying a voltage to a three-phase motor are preset, a current expected to flow through the motor is predicted from the output voltage of the inverter, set in one operating state, for each of the operating states, and the inverter is actually set in the operating state which minimizes the difference between the predicted current and an instructed current. Therefore, because the inverter is operated so as to optimize the variation of the predicted current, the problem described above can be avoided to a certain degree.

Published Japanese Patent First Publication No. 2006-174697 also proposes a control similar to this model prediction control.

However, the inventor of this application found out that, because the operating state is set in one control period of time by predicting a current flowing through the motor in the next control period of time, the current actually flow through the motor cannot be controlled with high precision. To control the current under this model prediction control with high precision, it is necessary in the present control period to provisionally determine one operating state, to be set in each of several control periods subsequent to the present control period, to predict a current of the motor for each of the provisionally-determined operating states, and to finally determine the operating state, to be set in the control period subsequent to the present control period, from the predicted currents. However, in the case of this prediction, the load of calculation on a computer is extremely increased.

SUMMARY OF THE INVENTION

An object of the present invention is to provide, with due consideration to the drawbacks of the conventional control device, a control device which controls an electric rotating machine while predicting a controlled variable of the machine according to the model prediction control with high precision so as to reduce the volume of calculation required for the prediction.

According to a first aspect of this invention, the object is achieved by the provision of a control device which controls a controlled variable of an electric rotating machine by controlling a power inverting circuit to be set in one of a plurality of controlled states and to apply a controlled voltage, corresponding to the controlled state, to the electric rotating machine, where the control device comprises a first predicting unit, a state determining unit, a control unit and a second predicting unit. The first predicting unit predicts the controlled variable of the electric rotating machine from information, indicating one controlled state set in the power inverting circuit, as a first prediction result, while using a second prediction result as an initial value of each first prediction result, for each of the controlled states set in the power inverting circuit. The state determining unit determines one controlled state from the first prediction results corresponding to the controlled states. The control unit controls the power inverting circuit to be set in the controlled state determined by the state determining unit. The second predicting unit predicts the controlled variable of the electric rotating machine as the second prediction result from information, indicating the controlled state determined by the state determining unit before the prediction of the second prediction result.

With this structure of the control device, the second predicting unit predicts, from information indicating the controlled state determined by the state determining unit and set by the control unit at a first renewal time, the controlled variable corresponding to the controlled state of the power inverting circuit to be set at a second renewal time. The controlled variable predicted by the second predicting unit is used as the initial value of the controlled variable predicted by the first predicting unit. The controlled variable predicted by the first predicting unit corresponds to the controlled state of the power inverting circuit to be set at a third renewal time.

To predict the controlled variable, appearing in the electric rotating machine at the third renewal time, with high precision on the assumption that the power inverting circuit set at one controlled state at the second renewal time maintains this controlled state during a control period between the second and third renewal times, it is desired to obtain the controlled variable, appearing at a time near to the second renewal time as close as possible to the second renewal time, as an initial value of the controlled variable appearing at the third renewal time. However, it is impossible or difficult to actually detect the value of the control led variable at a time near to the second renewal time. Further, because it is required that the controlled state of the power inverting circuit to be set at the second renewal time has been already determined at the second renewal time from the controlled variable predicted to appear at the third renewal time, it is physically impossible or difficult to predict the controlled variable appearing at the third renewal time with high precision.

In this invention, because the second predicting unit predicts the controlled variable, appearing in the machine at the second renewal time, from information indicating the controlled state determined by the state determining unit and set by the control unit at the first renewal time, the first predicting unit can predict the controlled variable appearing at the third renewal time with high precision while using the predicted controlled variable appearing at the second renewal time as an initial value of the controlled variable appearing at the third renewal time. That is, the control device can control the machine to be set in one controlled state appropriate to the machine at the second renewal time.

Accordingly, the control device can predict the controlled variable of the machine according to the model prediction control with high precision, while reducing the volume of calculation required for the prediction, and can appropriately control the power inverting circuit according to the predicted controlled variable.

DETAILED DESCRIPTION OF THE PREFERRED EMBODIMENTS

Embodiments of the present invention will now be described with reference to the accompanying drawings, in which like reference numerals indicate like parts, members or elements throughout the specification unless otherwise indicated.

First Embodiment

Figure 1:
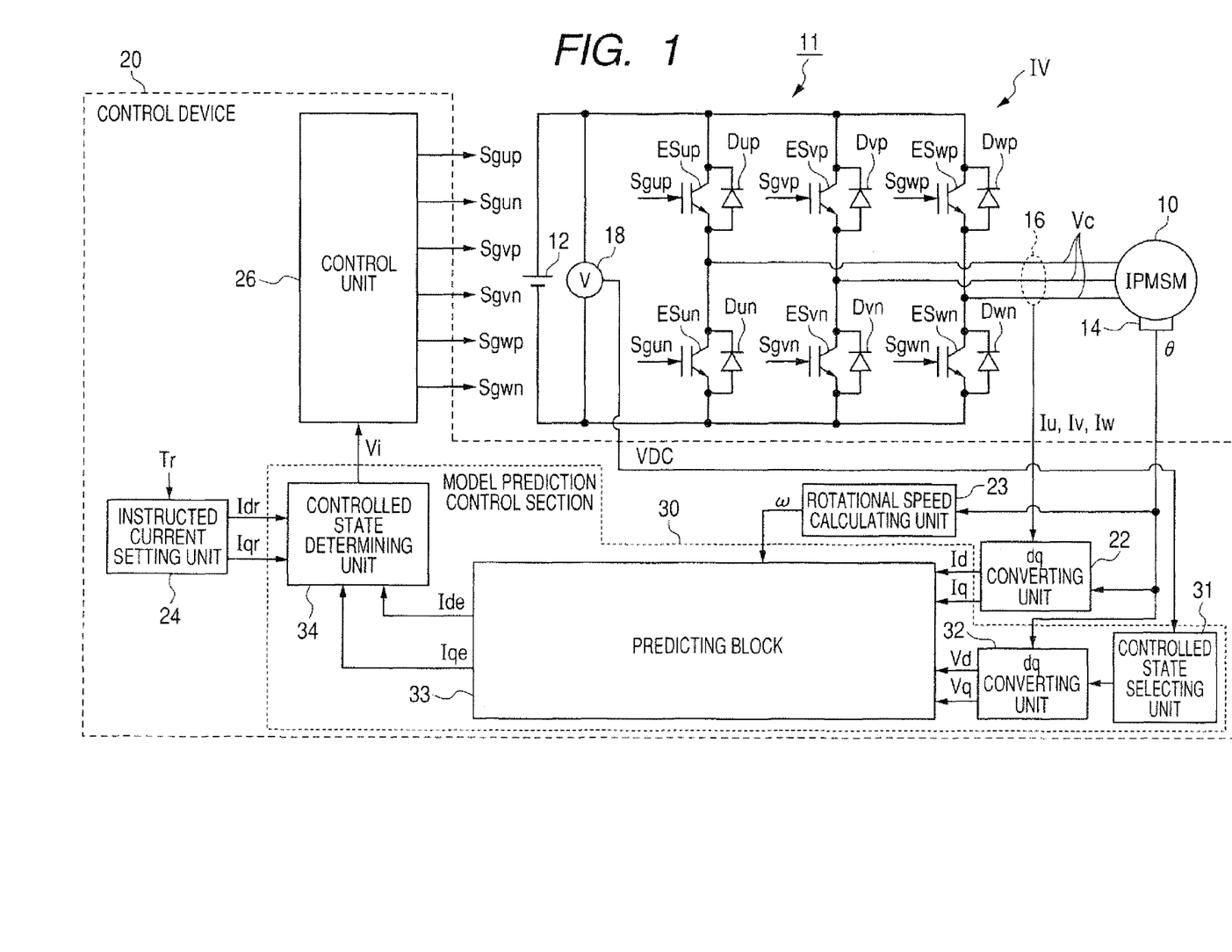
FIG. 1 is a view showing the structure of a control system having a control device for a motor generator according to the first embodiment of the present invention.

FIG. 1 is a view showing the structure of a control system having a control device for a motor generator according to the first embodiment.

As shown in FIG. 1, a high-voltage battery 12 supplies a direct current to a control system 11, the control system 11 converts this direct current into an alternating current of a controlled voltage Vc, and a motor generator 10 is driven by this alternating current to produce a driving torque. This power generating system including the generator 10, the system 11 and the battery 12 is, for example, mounted on a hybrid vehicle. The generator 10 represents an electric rotating machine whose feature is the presence of magnetic saliency.

More specifically, the generator 10 is a three-phase interior permanent magnet synchronous motor (IPMSM). This motor has a rotor, permanent magnets having salient poles and being disposed around a shaft of the rotor so as to be protruded from the shaft, a stator surrounding the rotor, and three windings (i.e., a u-phase winding, a v-phase winding and a w-phase winding) wound on the stator.

The control system 11 has an inverter IV, representing a power inverting circuit, for producing the controlled voltage Vc from a supply voltage VDC of the battery 12 and supplying a three-phase electric current (i.e., a u-phase current Iu, a v-phase current Iv and a w-phase current Iw defined on the uvw coordinate system) having the controlled voltage Vc to the generator 10 such that the current flows through the generator 10 as a controlled variable of the generator 10, a voltage sensor 18 for detecting the supply voltage VDC, a current sensor 16 for detecting the phase currents Iu, Iv and Iq, a rotational angle sensor 14 for detecting a rotational angle θ of the rotor of the generator 10 rotated in response to the phase currents, and a control device 20, composing a low voltage system, for receiving information of the rotational angle θ, information of the phase currents Iu, Iv and Iq, information of the supply voltage VDC from the sensors 14, 16 and 18 through an interface (not shown), receiving information of a target torque Tr and controlling the controlled voltage Vc of the inverter IV according to the received information to control the generator 10.

The inverter IV has u-phase switching elements ESup and ESun serially connected with each other; v-phase switching elements ESvp and ESvn serially connected with each other, w-phase switching elements ESwp and Swn serially connected with each other, and diodes Dup, Dun, Dvp, Dvn, Dwp and Dwn connected with the respective switching elements in parallel. Each switching element is made of an n-p-n insulated-gate bipolar transistor (IGBT). The emitters of the switching elements ESup, ESvp and ESwp are connected with the collectors of the respective switching elements ESun, ESvn and ESwn. The collectors of the switching elements ESup, ESvp and ESwp are connected with the higher voltage terminal of the battery 12, while the emitters of the switching elements ESun, ESvn and ESwn are connected with the lower voltage terminal of the battery 12. The anode of each diode is connected with the emitter of the corresponding switching element. The connecting point of the elements ESup and ESun is connected with the u-phase stator winding of the generator 10. The connecting point of the elements ESvp and ESvn is connected with the v-phase stator winding of the generator 10. The connecting point of the elements ESwp and ESwn is connected with the w-phase stator winding of the generator 10.

The control device 20 produces control signals Sgup, Sgun, Sgvp, Sgvn, Sgwp and Sgwn from the received information and transmits the signals Sgup, Sgun, Sgvp, Sgvn, Sgwp and Sgwn to bases of the respective switching elements ESup, Esun, Esvp, Esvn, ESwp and Eswn of the inverter IV to invert the supply voltage VDC of the direct current into the controlled voltage Vc.

The device 20 operates the inverter IV to indirectly control the torque actually produced in the generator 10 to the target torque Tr. More specifically, the device 20 operates the inverter IV to directly control an alternating current, actually flowing through the generator 10, to an instructed current required for the generator 10 to generate the target torque Tr. That is, in this embodiment, although the device 20 controls the torque of the generator 10 as a final controlled variable, the device 20 directly controls an alternating current, actually flowing through the generator 10, to the instructed current to control the torque of the generator 10.

Further, the inverter IV can be set in any of a plurality of controlled states (or operating states). Each controlled state corresponds to a pattern of on and off states of the switching elements. The current flowing through the generator 10 depends on each controlled state of the inverter IV.

In this embodiment, the control device 20 controls the inverter IV to be set in one of the controlled states at a renewal time every control period of time. More specifically, the device 20 predicts (i.e., estimates in advance) a first current, expected to flow through the generator 10 at a second renewal time elapsed by one control period from a first renewal time, from information indicating the controlled state of the inverter IV actually set at the first renewal time, while using the current actually flowing through the generator 10 in response to the controlled state set at the first renewal time as an initial value of the predicted current. Further, the device 20 predicts a second current, expected to flow through the generator 10 at a third renewal time elapsed by one control period from the second renewal time, from information indicating one controlled state imaginarily set in the inverter IV at the second renewal time for each of the controlled states imaginarily set in the inverter IV, while using the first predicted current expected to flow through the generator 10 at the second renewal time as an initial value of the second predicted current expected to flow through the generator 10 at the third renewal time. The device 20 determines one controlled state corresponding to one second predicted current, closest to the instructed current among the second predicted currents expected to flow through the generator 10 at the third renewal time, as a controlled state to be actually set in the inverter IV at the second renewal time. This control is called a model prediction control in this specification.

The control device 20 has a dq converting unit 22 for converting phase currents Iu, Iv and Iw detected in the sensor 16 into an actual current (i.e. an actual d-axis current Id and an actual q-axis current Iq defined on the dq rotational coordinate system) Idq by using the rotational angle θ of the sensor 14, a rotational speed calculating unit 23 for performing a differential calculation for the rotational angle θ with respect to time to obtain an electrical angle rotational speed ω of the rotor of the generator 10, an instructed current setting unit 24 for setting an instructed current (i.e., an instructed d-axis current Idr and an instructed q-axis current Iqr defined on the dq rotational coordinate system) Idqr from information of the target torque Tr, a model prediction control section 30 for determining a voltage vector Vi (i=0,1,--,7) of the controlled voltage Vc, corresponding to the controlled state to be actually set in the inverter IV, from information of the actual currents Id and Iq, the instructed currents Idr and Iqr, the rotational speed ω, the rotational angle θ and the supply voltage VDC, and a control unit 26 for producing the control signals Sgup, Sgun, Sgvp, Sgvn, Sgwp and Sgwn from the voltage vector Vi determined by the section 30 and supplying the signals to the inverter IV to set the inverter IV in the controlled state corresponding to the determined voltage vector Vi.

The dq rotational coordinate system is rotated with the rotor of the generator 10. The d-axis of the system is set so as to be directed from one S magnetic pole to the corresponding N magnetic pole in the rotor. The q-axis of the system is set to be orthogonal to the d-axis on a plane perpendicular to the rotation axis of the rotor. The original point of this system is placed on the rotation axis of the rotor. The units of the control device 20 are operated every control period of time.

Figure 2A:
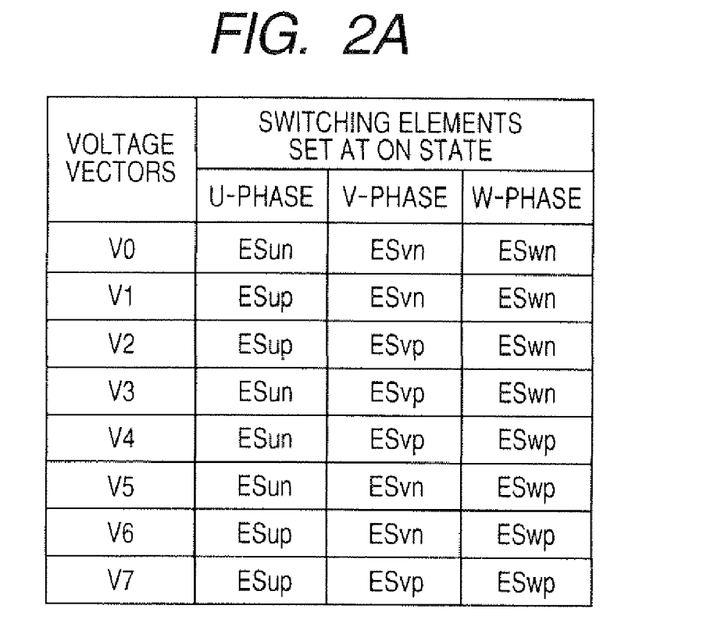
FIG. 2A shows the relation between voltage vectors of a controlled voltage and controlled states of an inverter shown in FIG. 1.
Figure 2B:
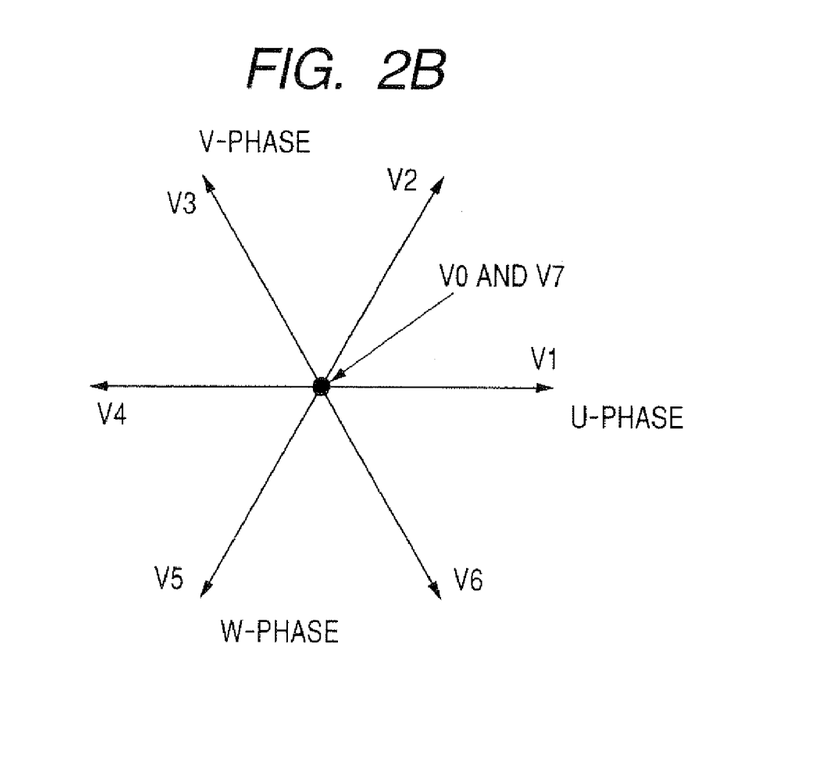
FIG. 2B shows directions and lengths of the voltage vectors.

FIG. 2A shows the relation between voltage vectors Vi of the controlled voltage Vc and controlled states of the inverter IV, while FIG. 23 shows directions and lengths of the voltage vectors Vi. As shown in FIG. 2A and FIG. 23, the inverter IV is set in one of eight controlled states. When the switching elements Esun, Esvn and Eswn on the lower electric potential side are set in the on state while the switching elements Esup, Esvp and Eswp on the high electric potential side are set in the off state, the control voltage Vc has the voltage vector V0. When the switching elements Esup, Esvp and Eswp are set in the on state while the switching elements Esun, Esvn and Eswn are set in the off state, the controlled voltage Vc has the voltage vector V7. In the case of the voltage vectors V0 and V7, all phases of the generator 10 are short-circuited, so that the value of the controlled voltage Vc is set at zero. Therefore, each of the voltage vectors V0 and V7 is called a zero vector. In contrast, when at least one of the switching elements Esun, Esvn and Eswn and at least one of the switching elements Esup, Esvp and Eswp are set in the on state, the controlled voltage Vc has one of the voltage vectors V1 to V6 having lengths longer than zero. Therefore, each of the voltage vectors V1 to V6 is called a non-zero vector.

As shown in FIG. 2B, the voltage vector V1 obtained by setting only the switching element Esup in the on state is directed toward the u phase and has the positive value, the voltage vector V3 obtained by setting only the switching element Esvp in the on state is directed toward the v phase and has the positive value, and the voltage vector V5 obtained by setting only the switching element Eswp in the on state is directed toward the w phase and has the positive value.

As shown in FIG. 1, the control section 30 has a controlled state selecting unit 31 for producing the voltage vectors V0 to V7 from information of the supply voltage VDC and selecting each of the voltage vectors V0 to V7 as the controlled state of the inverter IV corresponding to the selected voltage vector. Each voltage vector is defined on the uvw coordinate system. A phase component of the voltage vector is expressed by the value VDC/2 when the corresponding switching element Esup, Esvp or Eswp is set in the on state, while the phase component of the voltage vector is expressed by the value −VDC/2 when the corresponding switching element Esun, Esvn or Eswn is set in the on state. For example, the voltage vector V0 is expressed by (−VDC/2, −VDC/2, −VDC/2), and the voltage vector V1 is expressed by (VDC/2, −VDC/2, −VDC/2).

The control section 30 further has another dq converting unit 32 for converting each of the voltage vectors selected in the unit 31 into a voltage vector V(Vd, Vq), defined on the dq rotational coordinate system, by using the rotational angle θ.

The control section 30 further has a predicting block 33 for predicting, in a period between a first renewal time and a second renewal time elapsed by one control period Tc from the first renewal time, a d-axis current Ide and a q-axis current Iqe, expected to flow through the generator 10 at a third renewal time elapsed by one control period Tc from the second renewal time, from information produced in the units 22, 23 and 32 and information indicating the controlled state of the inverter IV actually set at the first renewal time, and a controlled state determining unit 34 for determining a controlled state, to be set in the inverter IV at the second renewal time, from the predicted current of the block 33.

More specifically, the predicting block 33 predicts a first d-axis current and a first q-axis current, expected to flow through the generator 10 at the second renewal time, from information indicating the controlled state determined in the determining unit 34 in the preceding control period and actually set in the inverter IV at the first renewal time and information indicating the rotational speed ω of the unit 23 while using the actual currents Id and Iq of the unit 22 as initial values of the respective predicted currents. Further, the predicting block 33 predicts a second d-axis current Ide and a second q-axis current Iqe expected to flow through the generator 10 at the third renewal time, on the assumption that the inverter IV is set in each of the controlled states selected in the unit 31 at the second renewal time, from information indicating the rotational speed ω of the unit 23 while using the first predicted currents Ide and Iqe as initial values of the respective second predicted currents Ide and Iqe. The predicting block 33 predicts the current vector Idqe=(Ide, Iqe) each time the unit 31 selects one controlled state.

In this current prediction, voltage equations (c1) and (c2):

$$Vd=(R+pLd)Id-\omega LqIq \quad (c1)$$

$$Vq=\omega LdId+(R+pLq)Iq+\omega\phi \quad (c2)$$

are used. Variables Vd and Vq denote a d-axis voltage and a q-axis voltage applied to the generator 10, variables Id and Iq denote a d-axis current and a q-axis current flowing through the generator 10, the parameter R denotes the resistance of the armature winding, the parameters Ld and Lq denote the d-axis inductance and the q-axis inductance, and the parameter φ is a constant of armature winding linkage magnetic fluxes. A differential operator p (i.e., d/dt) with respect to time is used.

A differential equation (c3) of a differential term pId of the d-axis current Id is obtained as a state equation by rearranging the terms of the equation (c1), and a differential equation (c4) of a differential term pIq of the q-axis current Iq is obtained as a state equation by rearranging the terms of the equation (c1).

$$pId=-(R/Ld)Id+\omega(Lq/Ld)Iq+Vd/Ld \quad (c3)$$

$$pIq=-\omega(Ld/Lq)Id-(R/Lq)Iq+Vq/Lq-\omega\phi/Lq \quad (c4)$$

The combination of the equations (c3) and (c4) is expressed as follows:

$$\frac{d}{dt}\begin{pmatrix}Id\\Iq\end{pmatrix}=\begin{pmatrix}-\frac{R}{Ld}&\omega\frac{Lq}{Ld}\\-\omega\frac{Ld}{Lq}&-\frac{R}{Lq}\end{pmatrix}\begin{pmatrix}Id\\Iq\end{pmatrix}+\begin{pmatrix}\frac{1}{Ld}&0\\0&\frac{1}{Lq}\end{pmatrix}\begin{pmatrix}Vd\\Vq\end{pmatrix}+\begin{pmatrix}0\\-\frac{\omega\phi}{L}\end{pmatrix}$$

From the currents Id and Iq flowing through the generator 10 in a first control period and the voltages Vd and Vq applied to the generator 10 in the first control period, the block 33 predicts currents Ide and Iqe expected to flow through the generator 10 in a second control period succeeding the first control period, on the assumption that the voltages Vd and Vq are applied to the generator 10 in the first control period, according to the equations (c3) and (c4). In this prediction, the difference calculus is, for example, applied for the equations (c3) and (c4) to set discrete variables every control period and to predict the currents Ide and Iqe from the discrete variables.

The determining unit 34 calculates a value of a predicting function J from the predicted currents Ide and Iqe of the block 33 and the instructed currents Idr and Iqr of the unit 24, each time the voltage vector is selected in the unit 31, and determines one controlled state corresponding to the value of the function J, indicating the highest level of prediction, as a controlled state to be actually set in the inverter IV at the second renewal time.

More specifically, the value of the function J(edq) is indicated by the squared length $edq^2=(Idr-Ide)^2+(Iqr-Iqe)^2$ of the current difference vector (Idr−Ide, Iqr−Iqe) between the instructed current vector Idqr=(Idr, Iqr) and the predicted current vector Idqe=(Ide, Iqe). Although each component of the current difference vector becomes positive or negative, the squared length is always positive. In this case, the value of the function J can be increased with the difference between the vectors Idqr and Idqe. That is, when the prediction level is set to be lowered with the increase of the value of the function J, the function J can be defined such that the prediction level is lowered with the increase of the difference in each component between the vectors Idqr and Idqe. Therefore, the unit 34 determines the controlled state of the inverter IV such that the value of the function corresponding to the determined controlled state is minimized.

Figure 3:
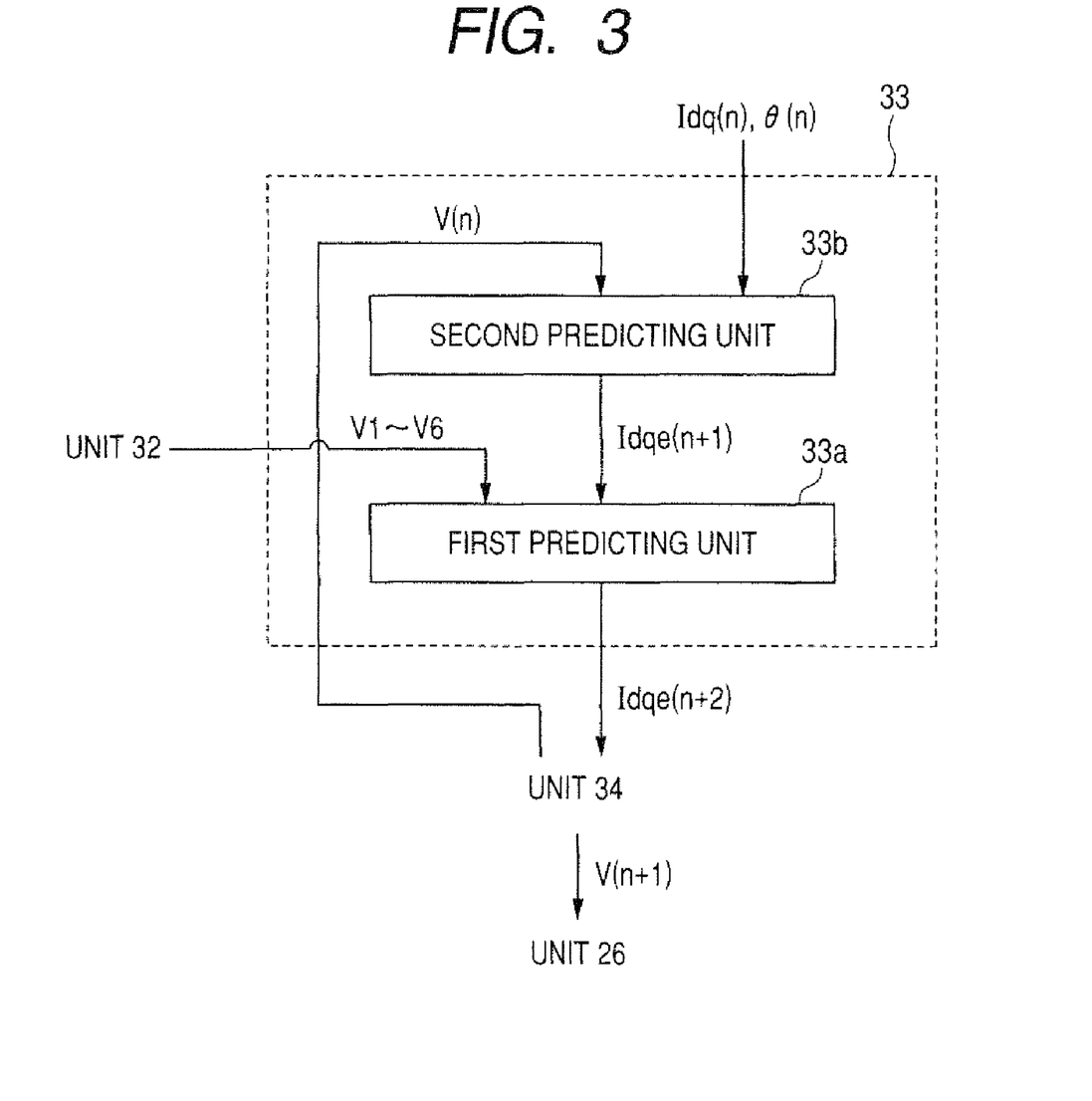
FIG. 3 is a block diagram of a predicting unit shown in FIG. 1.
Figure 4:
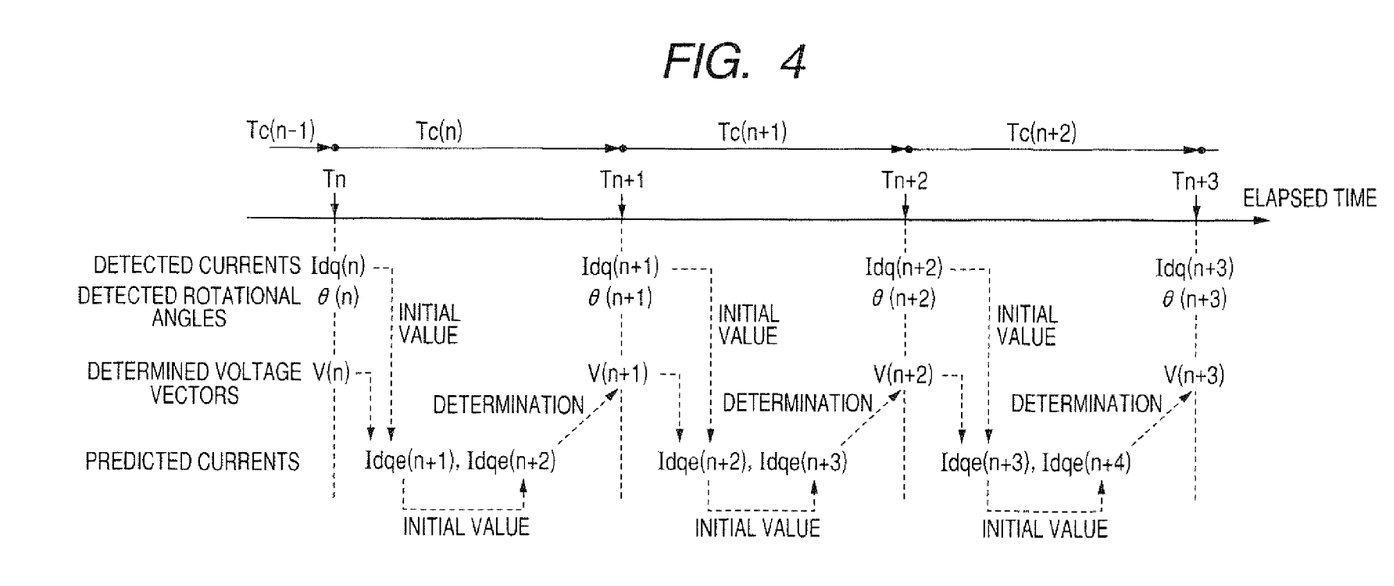
FIG. 4 is a time chart of an actual current vector, voltage vectors and predicted current vectors according to the first embodiment.

FIG. 3 is a block diagram of the predicting block 33, while FIG. 4 is a time chart of the actual current vector Idq=(Id, Iq), voltage vectors V and predicted current vectors Idqe=(Ide, Iqe) according to this embodiment.

As shown in FIG. 4, the voltage vector V of the controlled voltage Vc outputted from the inverter IV is renewed under control of the control device 20 at a renewal time T (e.g., Tn, Tn+1, Tn+2, - - - ) every control period of time Tc. As shown in FIG. 3 and FIG. 4, the block 33 has a first predicting unit 33a and a second predicting unit 33b.

In response to the voltage vector V(n) actually set at the renewal time Tn of the first control period Tc(n), the actual phase currents Iu, Iv and Iw and the rotational angle θ(n) at the renewal time Tn are detected in the sensors 14 and 16, the unit 33b receives information of the voltage vector V(n), information of the actual current vector Idq(n)=(Id(n), Iq(n)) obtained from the actual phase currents and information of the angle θ(n). The unit 33b predicts a current vector Idqe(n+1)=(Ide(n+1), Iqe(n+1)), expected to flow through the generator 10 at the renewal time Tn+1 of the second control period Tc(n+1) elapsed by one control period from the renewal time Tn, from the vectors V(n) and Idq(n) and the angle θ(n) while using the actual current vector Idq(n) as an initial value of the current vector Idqe(n+1). The unit 33a predicts a current vector Idqe(n+2)=(Ide(n+2), Iqe(n+2)), expected to flow through the generator 10 at the renewal time Tn+2 of the third control period Tc(n+2) elapsed by one control period from the renewal time Tn+1, while using the predicted current vector Idqe(n+1) as an initial value of the current vector Idqe(n+2), on the assumption that the inverter IV outputs the controlled voltage Vc of one voltage vector indicated by the information of the unit 32 at the renewal time Tn+1 of the second control period Tc(n+1), each time the unit 31 outputs the information to the block 33. The prediction in the units 33b and 33a are performed each time the voltage vector V is actually set at one renewal time.

In this embodiment, as shown in FIG. 4, the prediction of the current vector Idqe(n+1) corresponding to the controlled state of the inverter IV set at the renewal time Tn+1 is performed for the calculation of the initial value of the predicted current Idq(n+2) corresponding to the controlled state of the inverter IV set at the renewal time Tn+2.

To predict the current Idqe(n+2) with high precision on the assumption that the inverter IV set at one controlled state at the renewal time Tn+1 maintains this controlled state during the control period between the renewal times Tn+1 and Tn+2, it is desired to obtain a current, flowing through the generator 10 at a time near to the renewal time Tn+1 to the utmost, as an initial value of the predicted current Idqe(n+2). However, it is impossible or difficult to detect the current at a time near to the renewal time Tn+1. Further, because it is required that the controlled state of the inverter IV to be set at the renewal time Tn+1 has been already determined at the renewal time Tn+1 from the predicted current Idqe(n+2), it is physically impossible or difficult to appropriately set the inverter IV at the renewal time Tn+1.

In this embodiment, because the current Idqe(n+1) is predicted from information of the controlled state (i.e., the voltage vector V(n)) actually set in the inverter IV at the renewal time Tn, the current Idqe (n+2) can be predicted with high precision by using the current Idqe(n+1) as an initial value of the current Idqe(n+2).

Figure 5:
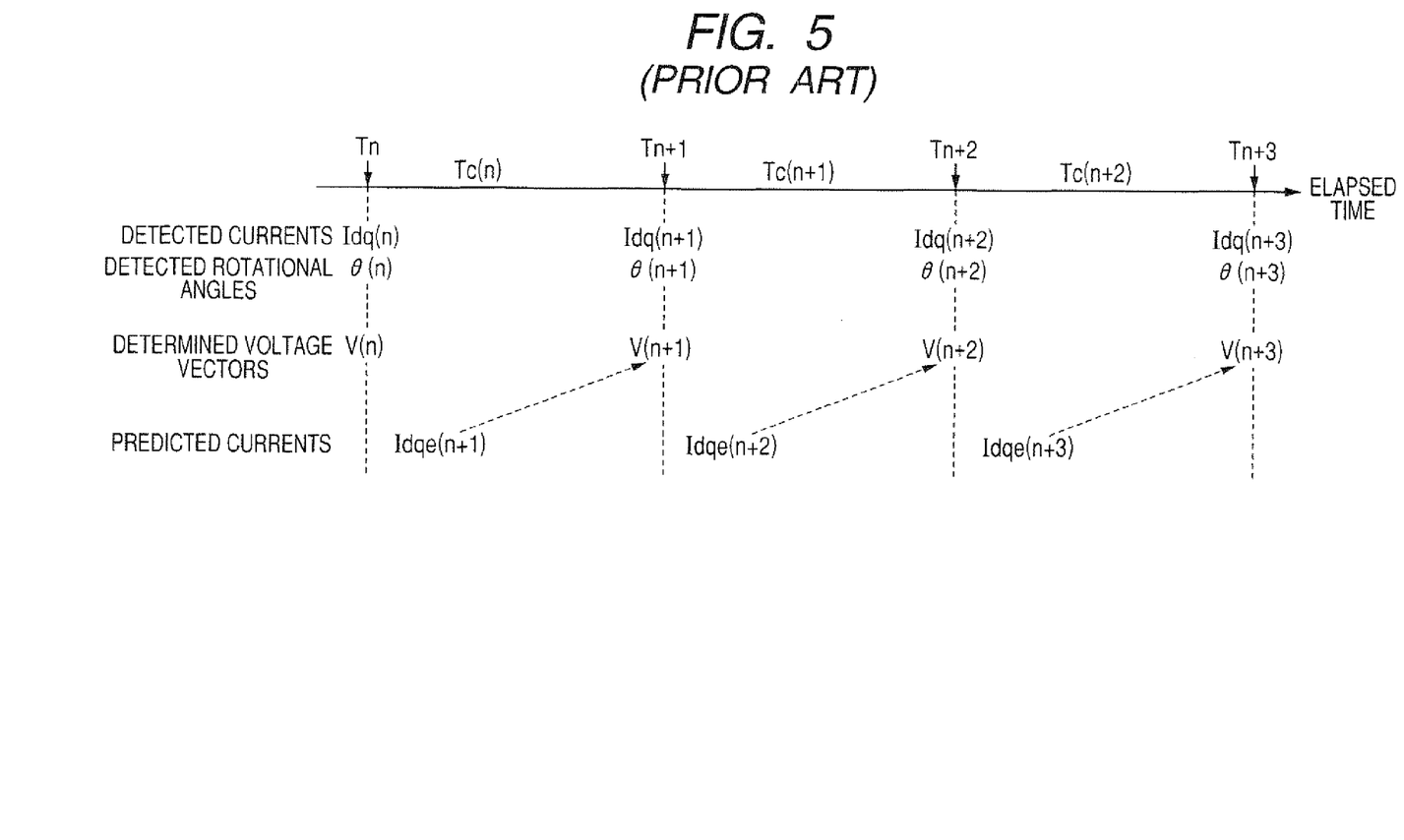
FIG. 5 is a time chart of an actual current vector, voltage vectors and predicted current vectors in the prior art.

In contrast, in the prior art as shown in FIG. 5, to determine the controlled state (i.e., the voltage vector V(n+1)) of the inverter IV, to be set at the renewal time Tn+1, in the first control period before the renewal time Tn+1, the difference calculus is used to use the value Idq(n) of the current, flowing through the generator 10 at the renewal time Tn, as an initial value of the predicted current Idqe(n+1). Therefore, when the discrete calculation using the control period Tc is performed, the current Idqe (n+1) can be predicted so as to intend the prediction of the current Idq(n+2) flowing at the renewal time Tn+2. However, it is not proper to use the current Idqe(n+1) as an initial value of the predicted current Idqe(n+2) required in the prediction. That is, the current Idqe(n+1) cannot be predicted with high precision to predict the current Idqe(n+2) flowing at the renewal time Tn+2. In this case, to determine the controlled state of the inverter IV set in the second control period subsequent to the first control period, it is often required to predict a plurality of currents flowing in several control periods subsequent to the first control period and to determine the controlled state of the inverter IV set in the second control period by calculating the value of a predicting function, depending on both one predicted current and an instructed current, for each of the predicted currents. Even in this conventional current prediction, when the controlled state set in the second control period is predicted based on the prediction of a plurality of currents flowing in several control periods subsequent to the present control period, the inventor of this application found out that the precision in the prediction of the current in the prior art approaches the precision in the prediction of the current according to this embodiment.

Figure 6:
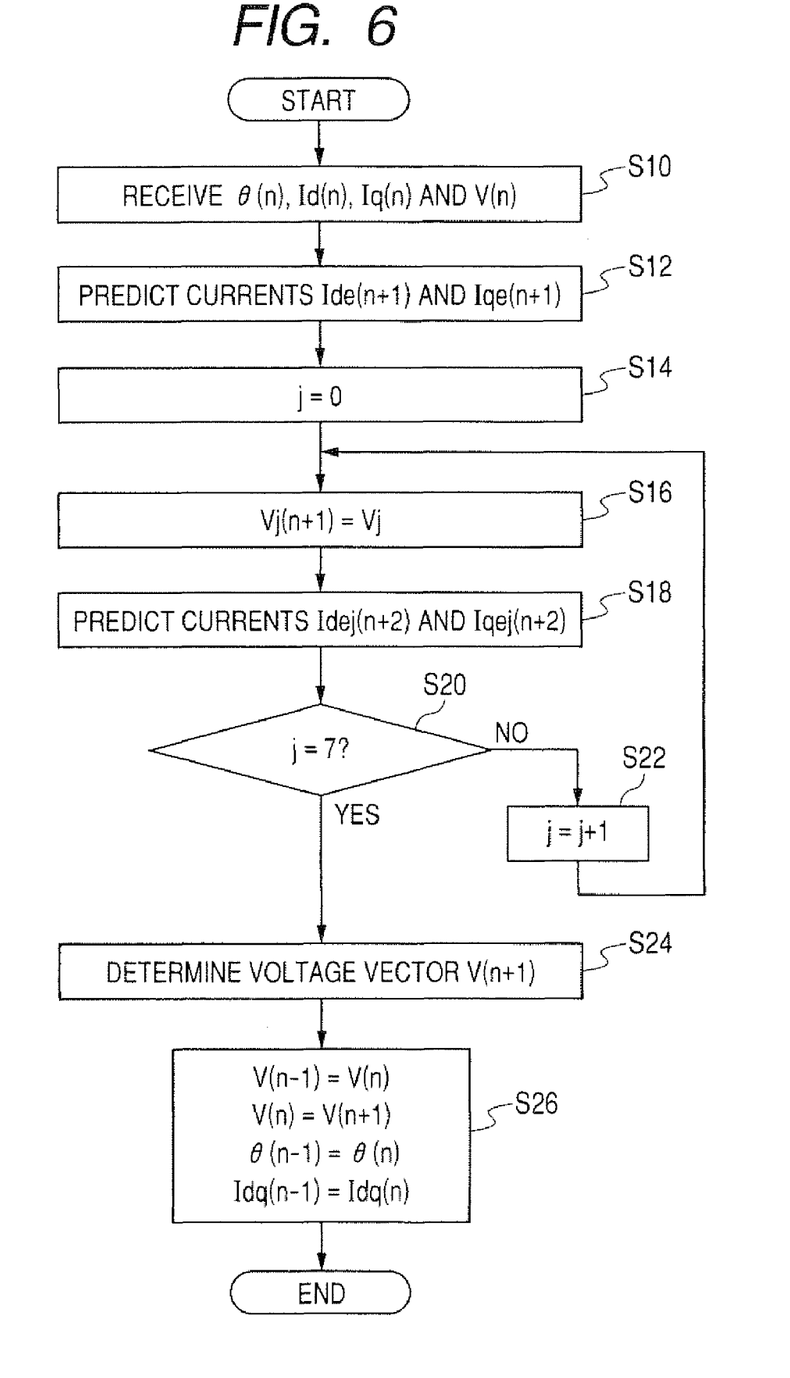
FIG. 6 is a flow chart showing the procedure of the current prediction and the determination of the controlled state performed in a control device shown in FIG. 1 according to the model prediction control.

An example of the current prediction and the determination of the controlled state will be described with reference to FIG. 6. FIG. 6 is a flow chart showing the procedure of the current prediction and the determination of the controlled state performed in the control device 20 according to the model prediction control. This current prediction and controlled state determination is performed every control period of time Tc. At a renewal time placed at the start of each control period, the control device 20 controls the inverter IV to be set in one determined controlled state.

The procedure shown in FIG. 6 is performed in the units 33 and 34 in the first control period Tc(n). At step S10, the second predicting unit 33b receives the rotational angle θ(n) detected in the sensor 14 and information indicating the actual currents Id(n) and Iq(n) detected in the sensor 16. Further, the unit 33b receives the voltage vector V(n) determined by the block 34 in the preceding control period Tc(n−1).

At step S12, the unit 33b predicts the currents Ide(n+1) and Iqe(n+1), expected to flow through the generator 10 in the second control period Tc(n+1) subsequent to the first control period Tc(n), from the rotational angle θ(n), the actual currents Id(n) and Iq(n) and the voltage vector V(n). More specifically, the forward difference calculus is performed for the equations (c3) and (c4) while using discrete variables set at intervals of the control period Tc, and the predicted currents Ide(n+1) and Iqe(n+1) are calculated. In this prediction, values of the actual currents Id(n) and Iq(n) are used as initial values of the predicted currents Ide(n+1) and Iqe(n+1). The voltage vector V(n) is converted to a voltage vector Vdq(n)= (Vd(n), Vq(n)) defined on the dq coordinate system. This prediction is expressed as follows:

$$Vdq(n) = C(\theta(n)) \cdot V(n)$$

$$Ide(n+1) = A \cdot Id(n) + B \cdot Vd(n) + F$$

$$Iqe(n+1) = A \cdot Iq(n) + B \cdot Vq(n) + F$$

while using the rotational angle θ(n).

Then, the first predicting unit 33a predicts the currents Ide(n+2) and Iqe(n+2), expected to flow through the engine 10 in the third control period Tc(n+2) subsequent to the second control period Tc (n+1), for each of the voltage vectors Vi on the assumption that the inverter IV is set in the controlled state indicated by the voltage vector Vi at the renewal time Tn+1. More specifically, at step S14, a variable j specifying the voltage vector is set at 0. At step S16, the voltage vector Vj selected in the unit 31 is expressed by the voltage vector Vj(n) which denotes a candidate for the voltage vector V(n) to be actually set in the inverter IV in the second control period Tc(n−1). At step S18, the currents Idej(n+2) and Iqej(n+2), expected to flow through the engine 10 in the third control period Tc (n+2), are predicted in the same manner as the prediction at step S12 by using the rotational angle θ(n), the predicted currents Ide(n+1) and Iqe(n+1) and the voltage vector Vj(n+1). In this prediction, values of the predicted currents Ide(n+1) and Iqe(n+1) are used as initial values of the currents Idej(n+2) and Iqej(n+2). The voltage vector Vj(n+1) is converted to a voltage vector Vdqj(n+1)=(Vdj (n+1), Vqj(n+1)) defined on the dq coordinate system. This prediction is expressed as follows:

$$Vdqj(n+1) = C(\theta(n) + \omega Tc) \cdot Vj(n+1)$$

$$Idej(n+2) = A \cdot Ide(n+1) + B \cdot Vde(n+1) + F$$

$$Iqej(n+2) = A \cdot Iqe(n+1) + B \cdot Vqe(n+1) + F$$

while using the rotational angle θ(n) and the value Δθ=ωTc.

At step S20, it is judged whether or not the variable j is equal to 7. That is, it is judged whether or not the prediction of the currents Idej(n+2) and Iqej(n+2) for all voltage vectors V0 to V7 has been completed. In the case of a negative judgment at step S20, the procedure proceeds to step S22. At step S22, the variable is incremented by one. Then, the currents Idej(n+ 2) and Iqej(n+2) for another voltage vector Vj are predicted at step S16 and step S18.

In contrast, in the case of an affirmative judgment at step S20, the prediction of the currents Idej(n+2) and Iqej(n+2) for all voltage vectors V0 to V7 has been completed. Therefore, at step S24, the unit 34 determines one voltage vector, minimizing the predicting function J among the voltage vectors V0(n+ 1) to V7(n+1), as the voltage vector V(n−1) to set the output of the inverter IV at the voltage vector V(n+1) during the second control period Tc(n+1). More specifically, the differential vector Edqj=(Idr−Idej(n+2), Iqr−Iqej(n+2)) between the instructed current vector Idqr=(Idr, Iqr) of the unit 24 and the predicted current vector Idqej=(Idej(n+2), Iqej(n+2)) is calculated, and the squared length edq$^2$=(Idr−Idej(n+2))$^2$+ (Iqr−Iqej(n+2))$^2$ of the differential vector is calculated as the value of the predicting function Jj(edq) for each value of the variable j. The voltage vector Vk(k=0, 1, 2, - - - or 7) corresponding to the predicting function Jk(edq) having the lowest value among eight values of the predicting functions J$_0$(edq) to J$_7$(edq) is determined as the voltage vector V(n+1).

Therefore, the unit 26 produces the control signals Sgup, Sgun, Sgvp, Sgvn, Sgwp and Sgwn according to the determined voltage vector V(n+1) and controls the inverter IV according to the control signals such that the inverter IV starts outputting the controlled voltage Vc having the determined voltage vector V(n+1) at the renewal time Tn+1.

Then, at step S26, the preparation for the determination of the voltage vector in the next control period is performed in the block 33. That is, the voltage vector V(n) is set as a voltage vector V(n−1), the determined voltage vector V(n+1) is set as a voltage vector V(n), the detected rotational angle θ(n) is set as a rotational angle θ(n−1), and the actual current vector Idq(n)=(Id(n), Iq(n)) is set as an actual current vector Idq(n−1)=(Id(n−1), Iq(n−1)). The vectors V(n−1) and V(n), the angle θ(n−1) and the vector Idq(n−1) newly set are stored in a memory (not shown).

In this embodiment, the following effects can be obtained.

The controlled state (i.e., voltage vector V(n)) already determined so as to set the inverter IV in the determined controlled state during the first controlled period Tc(n) is used for the prediction of the currents Ide(n+1) and Iqe(n+1) expected to flow through the generator 10 during the second controlled period Tc(n+1) subsequent to the first controlled period. Accordingly, the current prediction in the model prediction control can be performed with high precision.

The currents Id(n) and Iq(n) detected in the sensors 16 are further used as initial values of the currents Ide(n+1) and Iqe(n+1), and the currents Ide(n+1) and Iqe(n+1) in the second controlled period Tc(n+1) are predicted in the first controlled period Tc(n). Accordingly, the current prediction in the model prediction control can be performed with higher precision.

The predicted currents Ide(n+1) and Iqe(n+1) expected to flow during the second controlled period Tc(n+1) are used as initial values of the currents Ide(n+2) and Iqe(n+2) expected to flow through the generator 10 during the third controlled period Tc(n+2) subsequent to the second controlled period, and the currents Ide(n+2) and Iqe(n+2) are predicted in the first controlled period Tc(n), on the assumption that the inverter IV is set in one controlled state (i.e., voltage vector Vj(n+1)) at the renewal time Tn+1, for each of the controlled states. The controlled state (i.e., voltage vector V(n+1)) of the inverter IV to be set at the renewal time Tn+1 is determined from the currents Ide(n+2) and Iqe(n+2) predicted for each controlled state. Accordingly, the controlled state of the inverter IV in each control period can be appropriately determined.

In the process (e.g., step S12) for the prediction of the currents Ide(n+1) and Iqe(n+1) corresponding to the setting of the controlled state (i.e., voltage vector V(n+1)) of the inverter IV at the renewal time Tn+1, the detected currents Id(n) and Iq(n) are used as initial values of the currents Ide(n+1) and Iqe(n+1). In the process (e.g., step S18) for the prediction of the currents Ide(n+2) and Iqe(n+2), the predicted currents Id(n+1) and Iq(n+1) are used as initial values of the currents Ide(n+2) and Iqe(n+2). Therefore, these processes are substantially the same. Accordingly, the current predicting process can be easily designed, and the processes can be executed by using the same predicting elements (or arithmetic program).

Second Embodiment

In this embodiment, a torque actually generated in the generator 10 and a magnetic flux actually induced in the generator 10 are set as controlled variables of the generator 10 directly controlled by a control device, and a current representing a physical quantity, from which the torque and the magnetic flux can be calculated, is predicted, in the same manner as in the first embodiment, by using the detected current to determine the controlled state (i.e., voltage vector V(n+1)) of the inverter IV. The torque and the magnetic flux at the renewal time Tn+2 are predicted from the predicted currents Ide(n+2) and Iqe(n+2) expected to flow at the renewal time Tn+2. The control device controls the generator 10 such that the predicted torque and the predicted magnetic flux approach instructed values of the torque and magnetic flux.

Figure 7:
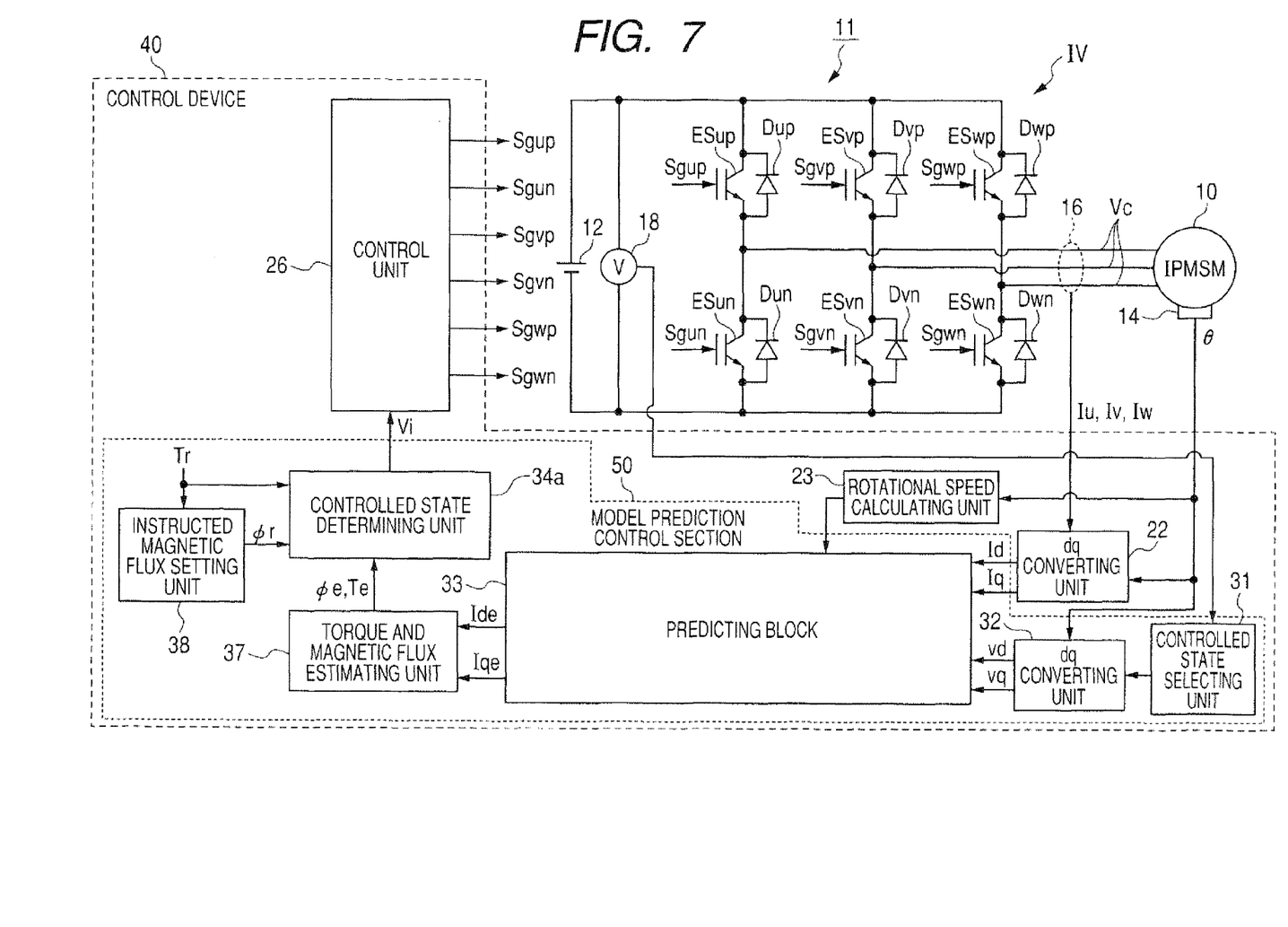
FIG. 7 is a view showing the structure of a control system having a control device for a motor generator according to the second embodiment of the present invention.

FIG. 7 is a view showing the structure of a control system having a control device for the generator 10 according to the second embodiment.

As shown in FIG. 7, a control device 40 in this embodiment differs from the device 20 shown in FIG. 1 in that the device 40 has a model prediction control section 50 composed of the block 33, a torque and magnetic flux predicting unit 37, an instructed magnetic flux setting unit 38 and a controlled state determining unit 34a, in place of the section 30 of the device 20.

The unit 37 predicts a magnetic flux vector Φe=(Φde, Φqe) defined on the dq rotational coordinate system and a torque Te from the predicted currents Ide and Iqe of the block 33 according to the following equations:

$$\Phi d = Ld \cdot Id + \phi \qquad (c5)$$

$$\Phi q = Lq \cdot Iq \qquad (c6)$$

$$T = P(\Phi d \cdot Iq - \Phi q \cdot Id) \qquad (c7)$$

where the parameter P denotes the number of pole pairs. In this prediction, by setting variables Id and Iq at the predicted currents Ide and Iqe, the variables Φd, Φq and T are calculated as the predicted magnetic flux components Φde and Φqe and the predicted torque Te.

The unit 38 has a magnetic flux map indicating the relation between a torque and a magnetic flux vector. The unit 38 receives the target torque Tr and sets an instructed magnetic flux vector Φr=(Φdr, Φqr) corresponding to the target torque Tr according to the relation of the map. The vector Φr is set so as to satisfy the requirement of the maximum torque control and the like. In this maximum torque control, the maximum torque is generated in the generator 10 from the minimum current.

The unit 34a calculates a value of a predicting function J from the predicted magnetic flux vector Φe, the predicted torque Te, the instructed magnetic flux vector Φr and the target torque Tr each time the unit 31 selects one voltage vector. Then, the unit 34a determines one controlled state corresponding to the value of the function J, indicating the highest level of prediction, as a controlled state (i.e. voltage vector V(n+1)) of the inverter Iv to be actually set in the second control period. More specifically, the torque difference ET=Tr−Te between the torques Tr and Te and the magnetic flux difference EΦ=Φr−Φe between the flux vectors Φe and Φr are calculated, and the value of the function J(ET, EΦ) is indicated by the sum $ET^2+E\Phi^2$ of the squared torque difference $ET^2$ and the squared magnetic flux difference $E\Phi^2$. The unit 34a determines the controlled state of the inverter IV corresponding to the minimum value of the function J among the values of the function J.

Therefore, in this control device 40, a physical quantity such as a current, from which controlled variables such as a torque and a magnetic flux can be calculated, appears in the generator 10 such that the physical quantity corresponds to the controlled state of the inverter IV set at each renewal time. As shown in FIG. 4, the physical quantity vector Idqe(n+1) corresponding to the controlled state (i.e., voltage vector V(n+1)) set at the second renewal time Tn+1 is predicted from the detected physical quantity vector Idq(n) corresponding to the controlled state (i.e., voltage vector V(n)) set at the first renewal time Tn. Then, on the assumption that one controlled state is set at the second renewal time Tn+1, the physical quantity vector Idqe(n+2) corresponding to the controlled state (i.e., voltage vector V(n+2)) set at the third renewal time Tn+2 is predicted, by using the predicted physical quantity vector Idqe(n+1) as an initial value of the physical quantity vector Idqe (n+2), for each of the controlled states set at the second renewal time Tn+1. Then, the controlled state (i.e., voltage vector V(n+1)) corresponding to one physical quantity vector Idqe(n+2), having the highest predicting level among predicting levels of the physical quantity vectors Idqe (n+2) corresponding to all controlled states, is determined to be appropriate to the generator 10 at the second renewal time Tn+1.

Accordingly, even when the control device 40 predicts the physical quantity different from the controlled variable, the device 40 can control the controlled variable of the generator 10, in the same manner as in the first embodiment.

In this embodiment, because there is no detecting unit (i.e. hardware) for directly detecting the controlled variable (i.e., actual torque or magnetic flux), the physical quantity (i.e., current) is predicted from the detected physical quantity (i.e., detected current). However, the engine control system shown in FIG. 7 may have a detecting unit for directly detecting the magnetic flux of the generator 10. In this case, the state equations of the magnetic flux:

$$p\Phi d = -(R/Ld)\Phi d + \omega \Phi q + Vd + R\phi/Vd \quad \text{(c8)}$$

$$p\Phi q = -(\omega/Lq)\Phi d - (R/Lq)\Phi q + Vq \quad \text{(c9)}$$

are obtained from the equations (c3) and (c4) and the equations (c5) and (c6). The block 33 predicts the magnetic flux vector $\Phi$dqe(n+1)=($\Phi$de(n+1), $\Phi$qe(n+1)) and the magnetic flux vector $\Phi$dqe(n+2)=($\Phi$de(n+2), $\Phi$qe(n+2)) from the detected magnetic fluxes $\Phi$d(n) and $\Phi$q(n), the rotational angle θ(n) and the information of the voltage vector V(n) according to the equations (c8) and (c9). The unit 37 calculates the predicted torque Te(n+2) from the vector $\Phi$dqe(n+2) and the vector Idqe(n+2) according to the equation (c7). Therefore, the unit 34a can determine the voltage vector V(n+1) from the predicted magnetic flux vector $\Phi$dqe(n+2) and the predicted torque Te(n+2). Accordingly, the control device 40 receiving the detected magnetic flux and current can control the controlled variables (i.e., magnetic flux and torque) of the generator 10, in the same manner as in the first embodiment.

Further, in this embodiment, the engine control system shown in FIG. 7 may have detecting units for directly detecting the magnetic flux and the torque of the generator 10, while detecting no current. In this case, in addition to the prediction of the magnetic flux, the torque is predicted. Then, the voltage vector V(n+1) is determined from the predicted magnetic flux vector $\Phi$dqe(n+2) and the predicted torque Te. Accordingly, the control device 40 receiving the detected controlled variables (i.e., magnetic flux and torque) can control the controlled variables of the generator 10, in the same manner as in the first embodiment.

Modifications

In each embodiment, controlled variables (e.g., currents Ide(n+2) and Iqe(n+2) or magnetic fluxes $\Phi$de(n+2) and $\Phi$qe (n+2)) are predicted for each of all voltage vectors V0 to V7. However, controlled variables may be predicted for each of the non-zero vectors V1 to V6 and one zero vector V0 or V7.

Further, in each embodiment, the predicting function J is indicated only by the difference between the predicted controlled variable and the instructed controlled variable. However, the predicting function J may be additionally indicated by the number of switching elements of which the on or off states set at the renewal time Tn are changed to the other states at the renewal time Tn+1.

Moreover, in each embodiment, the control variable or the physical quantity (e.g., the currents Ide(n+1) and Iqe(n+1) or the magnetic fluxes $\Phi$de(n+1) and $\Phi$qe(n+1)) expected in the second control period and the control variable or the physical quantity (e.g., the currents Ide(n+2) and Iqe(n+2) or the magnetic fluxes $\Phi$de(n+2) and $\Phi$qe(n+2)) expected in the third control period are predicted in the first control period to determine the controlled state of the inverter IV set in the second control period. However, control variables or physical quantities expected in several control periods subsequent to the first control period may be predicted one after another to determine the controlled state of the inverter IV set in the second control period. Even in this case, it is effective to predict the controlled variable or the physical quantity in the first control period from the detected controlled variable or the detected physical quantity.

Furthermore, in each embodiment, the actual current I=(Iu, Iv, Iw) is detected in synchronization with each renewal time. However, the current I may be detected at the middle time of the control period between the renewal time Tn, and the next renewal time Tn+1. Even in this case, it is effective to use the detected current as an initial value of the predicted current Idqe(n+1) corresponding to the controlled state (i.e., the voltage vector V(n+1)) set at the next renewal time Tn+1.

Still further, in each embodiment, the controlled variable (e.g., the current Idqe (n+2)) at the renewal time Tn+2, elapsed by one control period from the renewal time Tn+1, is predicted to renew the controlled state of the inverter IV at the renewal time Tn+1. However, the controlled variable at a middle time of the control period between the renewal time Tn+1 and the renewal time Tn+2 may be predicted to renew the controlled state of the inverter IV at the renewal time Tn+1.

Still further, the current is predicted as a controlled variable in the first embodiment to determine the controlled state of the inverter IV such that the predicted controlled variable approaches an instructed controlled variable, and the magnetic flux and the torque are predicted as controlled variables in the second embodiment to determine the controlled state of the inverter IV such that the predicted controlled variables approach instructed controlled variables. However, only the magnetic flux or only the torque may be predicted as a controlled variable to determine the controlled state of the inverter IV such that the predicted controlled variable approaches an instructed controlled variable. Further, the current and the torque may be predicted as controlled variables. When no current is used as a controlled variable, a controlled variable or a physical quantity different from a current may be detected by a sensor.

Still further, in each embodiment, the difference calculus such as a forward difference calculus is used to set discrete variables in the model prediction control applied in the continuous system. However, in place of the difference calculus, the linear multistage model may be used to set discrete values in N stages (N≧2) in the model prediction control, or Runge-Kutta method may be used to set discrete values in the model prediction control.

Still further, in each embodiment, only the fundamental wave component contained in the current is considered to predict the current in the model prediction control. However, the model considering higher harmonic wave components contained in the inductance and/or the induced voltage in addition to the fundamental wave component may be used. Further, the present invention is not limited to this model prediction control, but a map stored in a memory may be used. When the device 20 or 40 receives the voltage V=(Vd, Vq) and the electrical angle rotational speed ω as input parameters of the map, the predicted current denoting an output parameter of the map is determined from the map. The ambient temperature may be added as another input parameter of the map. The map indicates the relation between discrete values of the input parameters and values of the output parameter.

Still further, in each embodiment, the torque is set as the final controlled variable of the electric rotating machine represented by the generator 10, regardless of whether the torque is predicted. However, the rotational speed or the like in the generator 10 may be set as the final controlled variable.

Still further, in each embodiment, the model of predicting the current is used while disregarding iron loss caused in the generator 10. However, a model considering iron loss may be used.

As the electric rotating machine, the interior permanent magnet synchronous motor is used in the embodiments. However, any synchronous motor such as a surface magnet synchronous motor or a field winding synchronous motor can be used as the electric rotating machine. Further, any induction electric rotating machine such as an induction motor or the like may be used.

Further, the electric rotating machine is mounted on a hybrid vehicle in the embodiments. However, the electric rotating machine may be mounted on any vehicle such as an electric vehicle. Further, the electric rotating machine is not limited to a primary engine of a vehicle, but may be used as a secondary engine.

Moreover, positive and negative terminals of the high-voltage battery 12 adopted as the direct current source are used as voltage applying portions in the embodiments. However, output terminals of a converter boosting the output voltage of the battery 12 may be used as voltage applying portions.

Furthermore, the switching elements of the inverter IV are used as a power inverting circuit in the embodiments to electrically connect or disconnect each of a plurality of voltage applying portions, which apply different voltages, to or from each of terminals of the electric rotating machine through the switching elements. However, any power inverting circuit having a plurality of switching elements may be used on condition that the circuit electrically connects or disconnects each of a plurality of voltage applying portions, which apply three different voltages or more, to or from each of terminals of the electric rotating machine through the switching elements. For example, the circuit disclosed in Published Japanese Patent First Publication No. 2006-174697 may be used.

What is claimed is:

1. A control device which controls a controlled variable of an electric rotating machine by controlling a power inverting circuit, having a plurality of switching elements connecting and disconnecting a plurality of voltage applying portions applying different voltages with/from terminals of the electric rotating machine, to be set in one of voltage vectors determined according to on and off states of the switching elements, the controlled variable being at least one of an electric current flowing through the electric rotating machine, a torque of the electric rotating machine and a magnetic field of the electric rotating machine, wherein the control device comprises:
a first predicting unit that, when a plurality of controlled states of the power inverting circuit corresponding to the voltage vectors are imaginarily set so as to set the power inverting circuit in each of the controlled states at a second renewal time, predicts the controlled variable of the electric rotating machine for each of the imaginarily-set controlled states;
a control unit that determines one controlled state of the power inverting circuit, expected at the second renewal time, from the controlled variable predicted by the first predicting unit and sets the power inverting circuit in the determined controlled state at the second renewal time; and
a second predicting unit that receives a present controlled state already determined by the control unit to be used for the power inverting circuit at a first renewal time preceding the second renewal time and predicts an initial value, to be used for the prediction performed by the first predicting unit, by using the present controlled state, and
wherein a value of the controlled variable predicted by the first predicting unit relates to a time after a time relating to the value predicted by the second predicting unit.

2. The control device according to claim 1, wherein the second predicting unit receives a detected value of either the controlled variable or a physical quantity, from which a value of the controlled variable can be calculated, and predicts a value of the controlled variable or the physical quantity, from which the value of the controlled variable can be calculated, expected at the second renewal time of the controlled state, set by the control unit, by using the detected value.

3. The control device according to claim 2, wherein the control unit renews the controlled state of the power inverting circuit every control period of time, and the first predicting unit predicts the controlled variable expected at a third renewal time, elapsed by one control period of time from the second renewal time of the controlled state set by the control unit, by using the value of the controlled variable predicted by the second predicting unit as the initial value.

4. The control device according to claim 3, wherein the second predicting unit predicts the value of the controlled variable or the physical quantity, from which the value of the controlled variable can be calculated, at the second renewal time, elapsed by one control period of time from the first renewal time, by using both the controlled state adopted at the first renewal time and either the value of the controlled variable or the physical quantity detected in synchronization with the first renewal time.

5. The control device according to claim 1, wherein the voltage applying portions are a positive terminal and a negative terminal of a direct current source, and the power inverting circuit has the switching elements which can connect each of the positive and negative terminals of the direct current source with any terminal of the electric rotating machine.

* * * * *